United States Patent [19]
Parienti

[11] Patent Number: 5,189,287
[45] Date of Patent: Feb. 23, 1993

[54] SYSTEM FOR INPUTTING, PROCESSING AND TRANSMITTING INFORMATION AND DATA

[76] Inventor: Raoul Parienti, 107, avenue Leon-Beranger, Saint-Laurent-du-Var, France, F06700

[21] Appl. No.: 656,057
[22] PCT Filed: Jun. 22, 1990
[86] PCT No.: PCT/FR90/00460
§ 371 Date: Mar. 6, 1991
§ 102(e) Date: Mar. 6, 1991
[87] PCT Pub. No.: WO91/00574
PCT Pub. Date: Jan. 10, 1991

[30] Foreign Application Priority Data
Jun. 23, 1989 [FR] France .................. 89 08653

[51] Int. Cl.[5] .................. G06F 15/26; G06F 15/30
[52] U.S. Cl. .................. 235/375; 235/379; 235/386
[58] Field of Search .................. 235/379, 382, 375; 340/825.28, 825.29, 825.31

[56] References Cited
U.S. PATENT DOCUMENTS
| | | | |
|---|---|---|---|
| 4,353,064 | 10/1982 | Stamm | 235/382 |
| 4,449,186 | 5/1984 | Kelly et al. | 364/407 |
| 4,503,288 | 3/1985 | Kessler | 379/67 |
| 4,764,666 | 8/1988 | Bergeron | 235/380 |
| 4,945,216 | 7/1990 | Tanabe et al. | 235/375 |
| 5,003,472 | 3/1991 | Perrill et al. | 235/375 |
| 5,057,676 | 10/1991 | Komaki | 235/375 |

FOREIGN PATENT DOCUMENTS
| | | | |
|---|---|---|---|
| 2514537 | 4/1983 | France . | |
| 5193 | 1/1990 | Japan | 235/375 |
| 2119141 | 11/1983 | United Kingdom | 235/382 |
| 8707106 | 11/1987 | World Int. Prop. O. . | |
| 8803297 | 5/1988 | World Int. Prop. O. | 235/375 |

Primary Examiner—John W. Shepperd
Attorney, Agent, or Firm—Sandler Greenblum & Bernstein

[57] ABSTRACT

A system for inputting, receiving and transmitting information and data includes a plurality of portable casings that are each formed with a card slot for selectively receiving memory cards of the dual-chip type. The portable casings are further provided with a keyboard, a display screen, an infrared transmitter and receiver, an optical scanner, and an acoustic assembly composed of a speaker and a microphone. The portable casings are capable of transmitting and receiving information with a computer center, via a specialized terminal, and with other portable casings, either optically by virtue of infrared transmitters and receivers or acoustically over a telephone network.

12 Claims, 6 Drawing Sheets

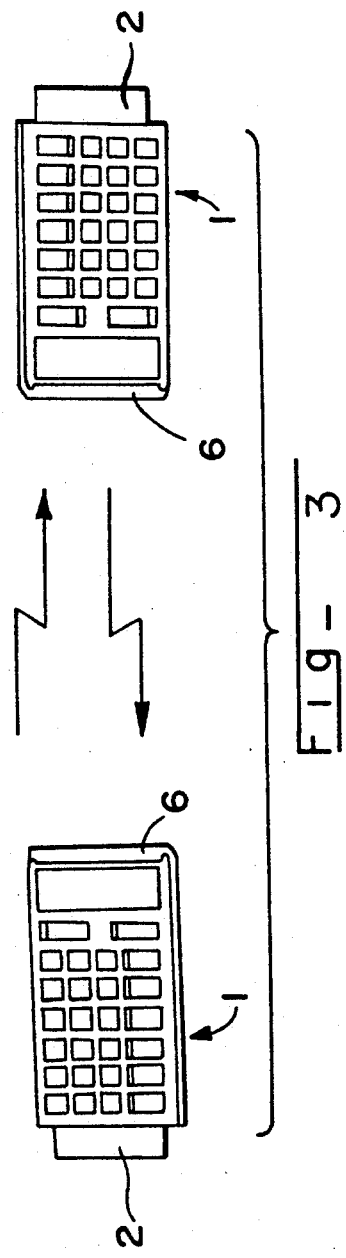
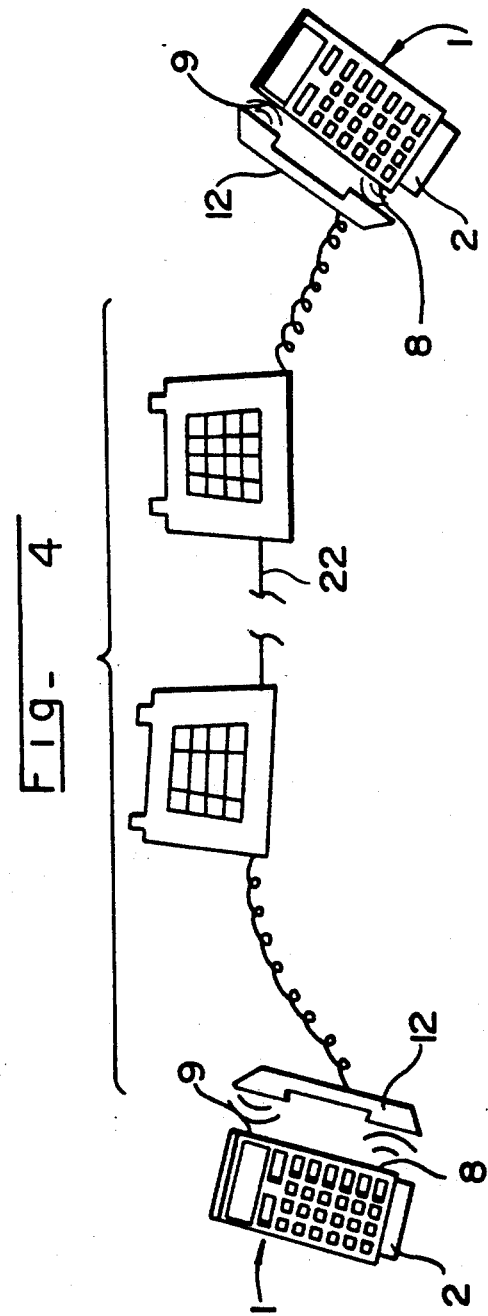

SYSTEM FOR INPUTTING, PROCESSING AND TRANSMITTING INFORMATION AND DATA

BACKGROUND OF THE INVENTION

The evolution of society has led to an exponential increase in the input and transmission of data via all types of communication systems.

Despite the remarkable advances made by technology, paper still plays much too important a role, both for the input and for the use of data The advances made in computer science have not yet gotten rid of the order form, the plane ticket, the receipt, etc.

SUMMARY OF THE INVENTION

The following invention aims to eliminate the disadvantages described above. The system represented in the present patent is especially meant for a specific population, for example, subscribers, who are called upon to communicate on a regular basis with a central structure. The system presented in the present patent may be used for a wide number of applications, such as, hotel, plane or any other type of reservations, mail orders, technical or medical diagnoses, access to friendly services of a social nature, to message centers, etc. In order to better understand the invention, we will describe below a non-limiting embodiment of the invention as an example. It is especially adapted to subscribers of an airline. The following document first describes the specific application of the invention that enables long distance and automatic reservations and payments for a flight, as well as the obtaining of boarding cards, via a telephone line and/or a plurality of terminals.

BRIEF DESCRIPTION OF THE DRAWINGS

The present invention will be described in detail with respect to the accompanying drawings, in which similar reference numerals represent similar elements throughout the several views, and wherein:

FIG. 3 illustrates two portable casings of the present invention communicating, by virtue of their respective infrared transmitters and receivers;

FIG. 4 illustrates two portable casings of the present invention communicating, via a telephone network, by virtue of their respective acoustic assemblies;

DESCRIPTION OF THE INVENTION

Figure 1A:
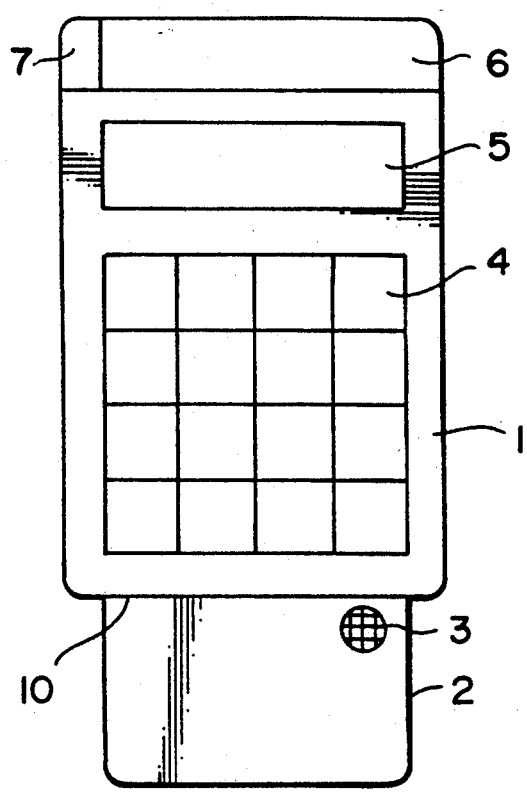
FIGS. 1A and 1B are detailed views of a portable casing according to the present invention.
Figure 1B:
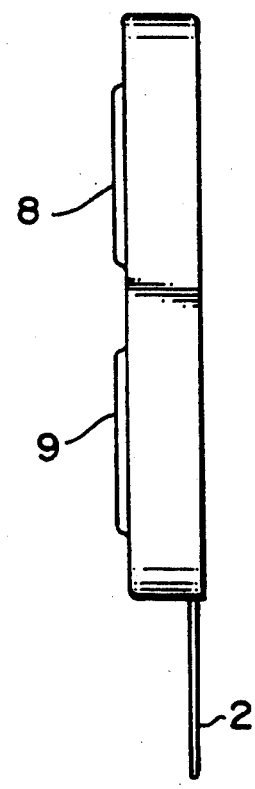

Referring to FIGS. 1A and 1B, the device consists of a casing 1 adapted to receive a memory card 2 in a card slot 10.

The casing 1 is equipped with a keyboard 4, a screen 5, an infrared unit 6 with integrated receiver and transmitter components, and of an acoustic assembly composed of a speaker 8 and a microphone 9. The casing 1 is also provided with an optical receiver 7 capable of reading optical signals (bar codes, etc.). The microphone 9 and the speaker 8 may either be grouped together, or be separate, for example, by a linkage that would enable the speaker-microphone pair to be located conveniently, respectively on the microphone and on the speaker of a or a multi-chip type. For a better understanding, we will now explain the dual-chip concept.

One of the chips, functioning as permanent memory means, will remain permanently on the card, and will be able to retain permanent data, such as user information, type of subscription, address and/or a set of data that is not expected to change rapidly. The second chip, on the other hand, functioning as removable memory means, will be of removable and temporary-type, and as such, will be replaced regularly in order to follow the changes and the modification of variable parameters, such as time tables, prices and other periodic variations.

The subscriber will receive, for example, a new chip every six months, at the same time as all the other "paper" documents that each subscriber receives regularly. Once the removable chip 3 is snapped on, the apparatus will be able to communicate all kinds of data, at the request of the user, relating, for example, to the flights of an airline that could interest the subscriber.

The human-casing dialogue will be done by virtue of an alpha-numeric keyboard 4, and a screen 5 that will enable friendly communication. The casing-central computer dialogue will take place by virtue of a simple telephone, in accordance with the following modalities:

In order to make flight reservations, the user will type the destination in an abbreviated form (three letters, for example) on the keyboard 4, and then the desired time of the flight. The memorized data on the removable chip 3 will be consulted and brought up on the screen 5 according to the choice made, and the user will get all the details of his flight: flight number, time, price, etc.

The choice of the flight can also be done by the bar code scanner device 7 on any ad-hoc document The user will have to lift the telephone off the hook and press a key of the keyboard 4, and the apparatus will send the DTMF to execute the dialing command, and then, all the data will be sent by the speaker 8, placed in application against the microphone of the handset 12. The initial dialing will be done manually if the line is not connected to an electronic computer center. Once the data has been transmitted, the computer processes the data and either sends the confirmation, or suggests another flight, if the desired flight is full. To receive information, the microphone 9 must be placed in application against the speaker of the handset 12, this procedure can be done according to two modalities:

Either the apparatus is pressed on the microphone of the handset 12 for the transmission of data, and then replaced on the speaker, after the user has received a signal indicating the end of the transaction by the speaker of the handset, and/or by a message on the screen 5 or, by virtue of an acoustic and/or luminous signal of the apparatus, or else the transmission of data will be done, not in two consecutive phases, but in a single phase: in order to do this, it will be necessary for the data to be transmitted from the casing 1 to the computer and from the computer to the casing at the same time, by appropriately placing the microphone/speaker pair of the casing on that of the handset; in this case, it would be useful to vary the distance and the inclination of the microphone/speaker pair. This adjustment can be done by virtue of a linkage, or by any other type of well-known telescopic system.

Figure 8:
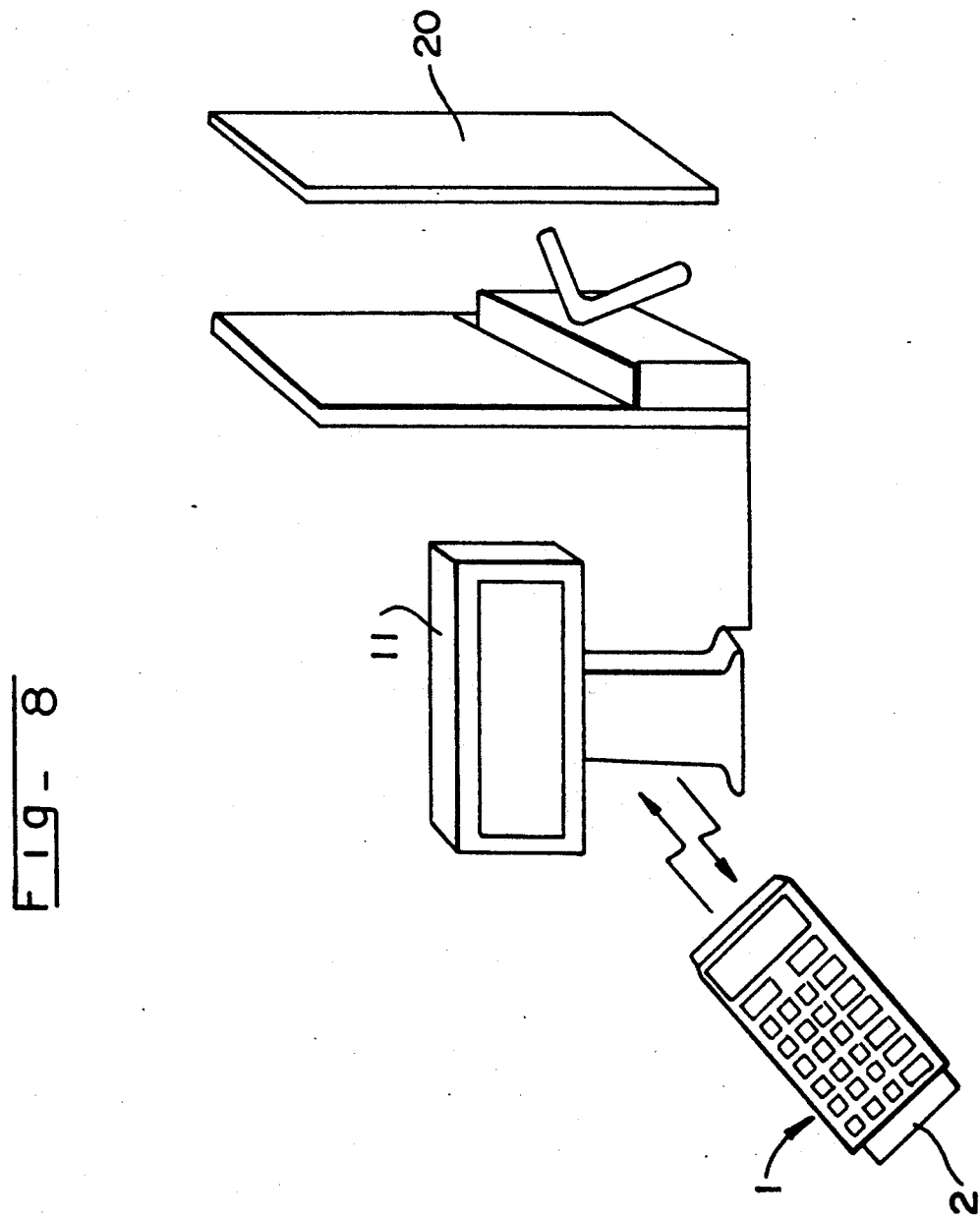
FIG. 8 depicts another embodiment of the present invention wherein a specialized terminal authorizes access through a gate based upon the data transmitted from a portable casing.

After the user sees his flight confirmed by the computer, the parameters related to this flight will be memorized in the permanent chip of the card. Actually, for all the procedures that will follow, the casing will serve as a substitute for the traditional ticket, and all the elements of the chip may be consulted at any time, either by the passenger, or by any other authorized person or organization. From this moment onwards, the casing will enable the passenger to board the flight by virtue of an infrared interface. As shown in FIG. 8, and in fact, when the user has to pass through different gates or an access passage 20 in order to embark on the plane, a permanent specialized terminal 11 will emit an infrared signal, recognized by the portable casing 1 as an invitation to transmit the elements concerning the flight chosen and confirmed by the user during the acoustic transmission described previously.

The portable casing 1 will, in fact, dialogue with the terminal 11 in order to verify and validate the passage, if all is considered normal. After the transfer of data with the central computer, the terminal 11 will enable the passenger to pass through, in accordance with any procedure adopted by the airline: releasing a turnstile, emitting any type of acquiescence signal, etc. If there is an irregularity, the system will display its disagreement and will not allow passage. At all times, the casing will serve as the ticket, by displaying, when necessary, the particulars of the flight. Moreover, the permanent chip will memorize the flights of each user in order to enable the different advantages offered by the company to be applied to each case: a free ticket for X number of flights, according to such or such criteria, flight histories, etc.

Of course, these different elements must respect confidentiality laws and, to this effect, it would be possible, not to have access to the data except by virtue of a secret personal code.

Figure 5:
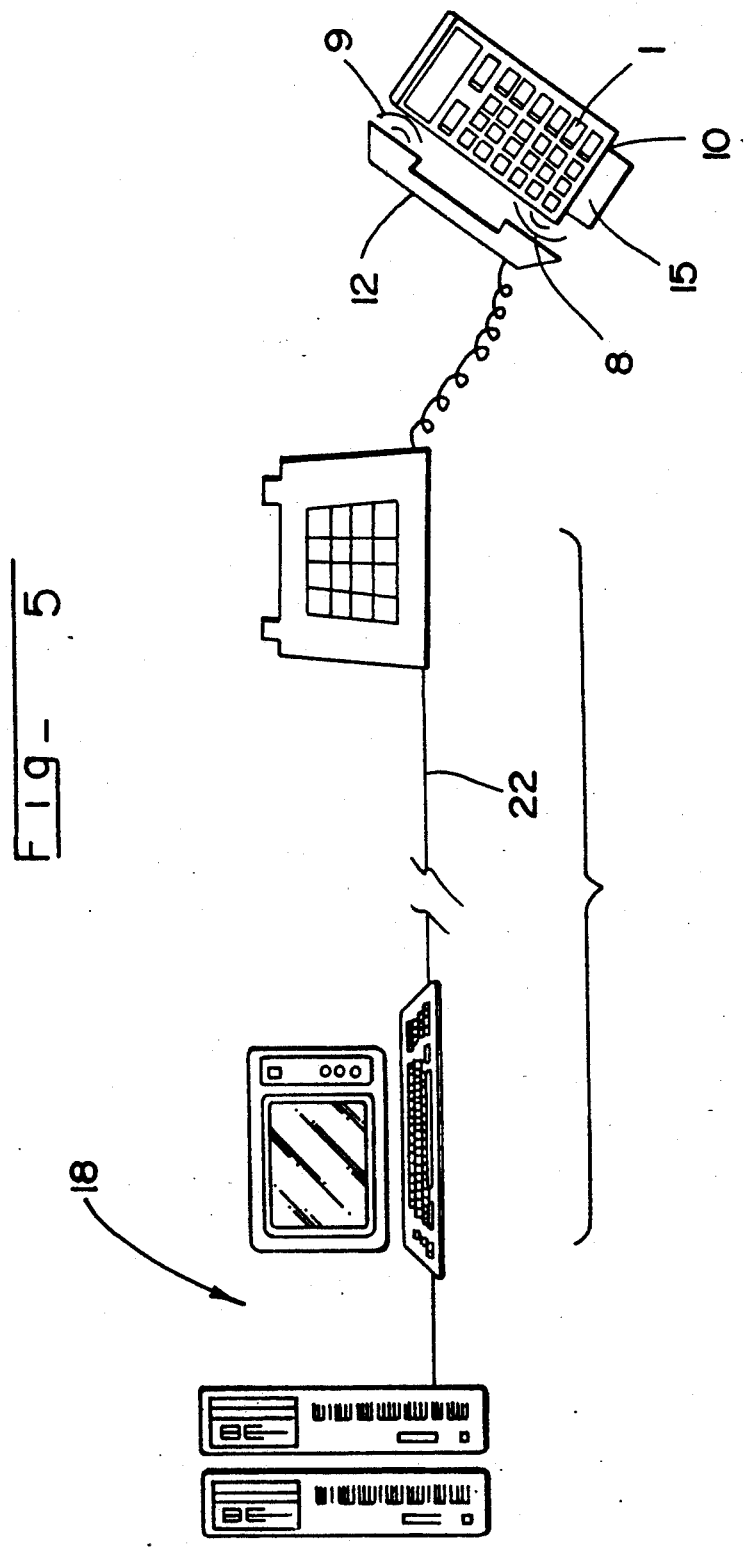
FIG. 5 depicts an embodiment of the present invention wherein a portable casing is used to make a long distance payment via a telephone network.

According to another version, the apparatus may also serve as a means of payment. As illustrated in FIG. 5, in order to do this, it will be necessary to replace the chip card 2 in the card slot 10 of the portable casing 1 with a bank card 15 with chips, or with any other credit card, and in fact, the bank card 15 may have a recess that will enable it to receive the removable chip. A long distance payment will be done by virtue of an acoustic interface, similar to that of the data transfer, during the reservation phase described previously, whereby data is transmitted between speaker 8, microphone 9 and handset 12, and via a telephone line 22 to a computer center 18. The same telephone line 22 will also enable the memorized data to be reactualized in the removable chip. Another application of the system described in the present patent is the friendly communication between the portable systems described previously and any other device capable of dialoguing with the portable systems.

Three non-limiting embodiments of the use of the invention will be described hereafter:

1) PORTABLE/SYSTEM
2) PORTABLE/PORTABLE
3) PORTABLE/SYSTEM/PORTABLE OR INDIVIDUAL

Figure 6:
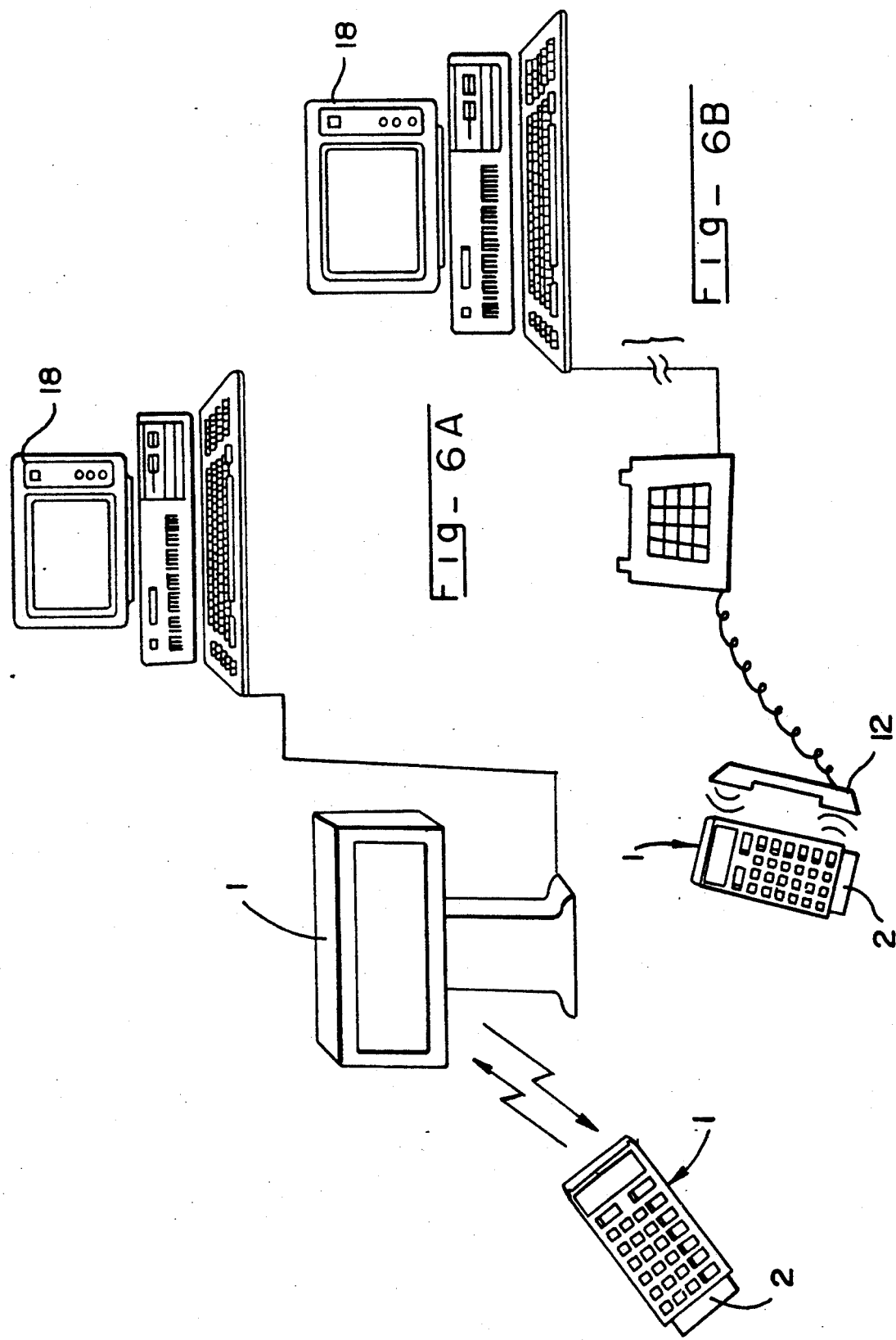
FIGS. 6A and 6B illustrate the specialized server/computer center of the present invention communicating with a portable casing via a specialized terminal and a telephone network, respectively.

The first embodiment mentioned above, is in fact, the case of airline reservation systems, seen above, but the PORTABLE/SYSTEM application of the most general type, will include, among others, mail orders. The clientele need only slide the optical scanner 7 on the reference(s) desired, lift the telephone off the hook and the transmission of data will be done automatically towards a specialized server or computer center 18 (as shown in FIG. 6B), which, on receiving the data, will interpret it and send the client an acknowledgment, a suggestion, etc. Of course, during the transmission of data, the casing took into account the individual parameters of each client, memorized in the chip card.

In a second embodiment, PORTABLE/PORTABLE, the data of a portable casing 1 are directly transmitted to another portable casing 1, either by virtue of their respective optical units 6 (as shown in FIG. 3) or acoustically (as shown in FIG. 4) by a telephone line, and in this case, the user will have to type a text or different data via the keyboard 4, or by any other means available on the portable and then the data will be received by another waiting portable, at the other end of the telephone line 22. In this case, the present system has the advantage of transmitting data rapidly and economically, especially, when the transmitting and receiving casings are separated geographically.

Figure 7:
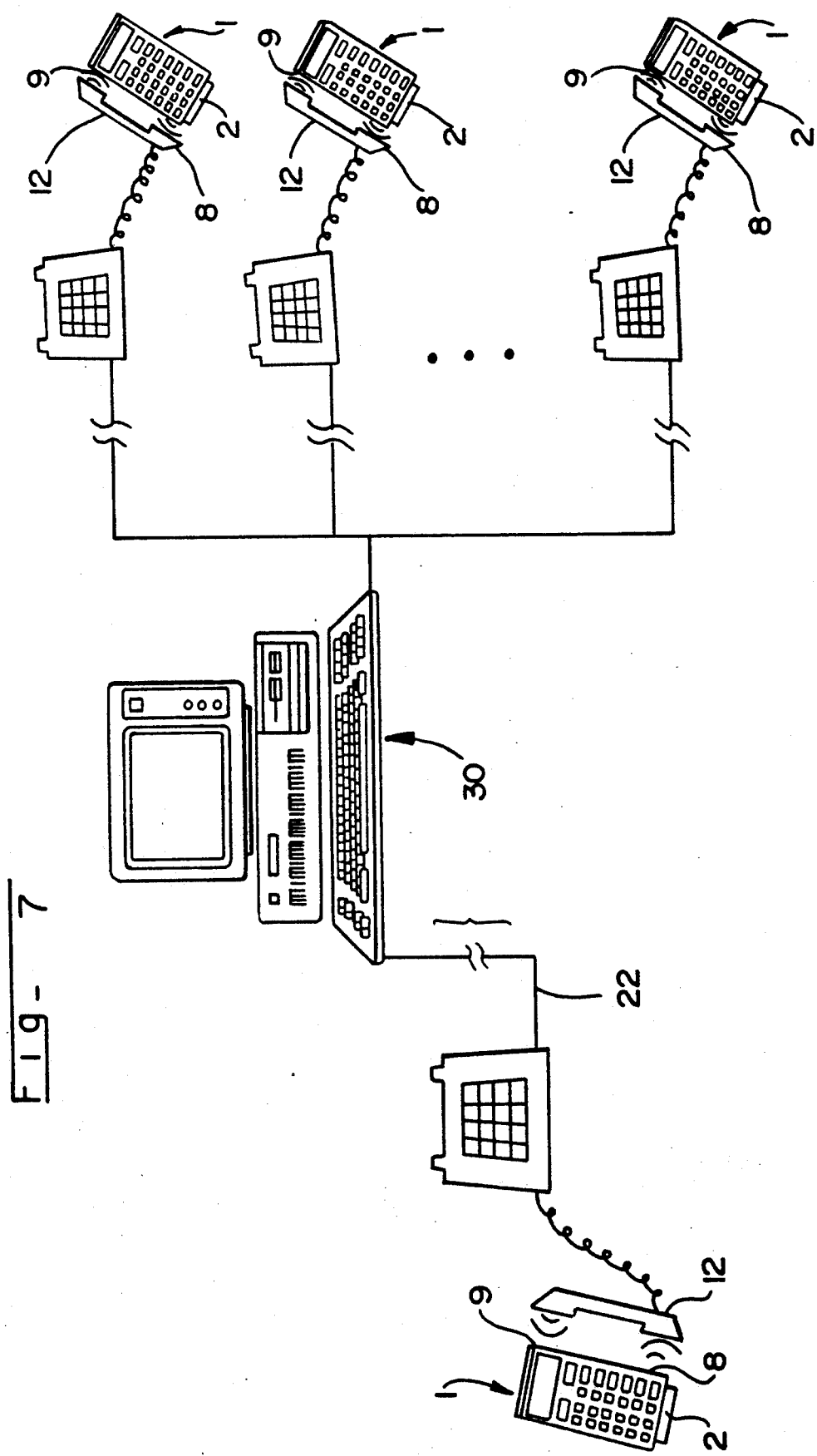
FIG. 7 depicts another embodiment of the present invention wherein a central server analyzes and diverts information to portable casings, via a telephone network, in accordance with the requested information transmitted by a portable casing.

Finally, in the third embodiment of the system presented in the present patent, that is to say, a PORTABLE/SYSTEM/PORTABLE or the owner of a portable casing 1, the concept concerns a message center, especially for an inter-subscriber service via a server center adapted to this effect. Referring to FIG. 7, the subscriber who is qualified by virtue of the data memorized in the chip card 2 installed in his portable casing 1, can contact another interlocuter whose profile corresponds with a specific request, via a central server system 30. Example a user, subscribing to a "Cinema lovers" service, and arriving in an unknown town, who wishes to see the latest film of a particular director, can do so, in the company of a university student, fan of the same director, and wanting to see the same film.

The user will program all the elements relative to his wishes, by the keyboard 4, and by virtue of a friendly exchange authorized by the chip dedicated to a specific application.

Once the data has been entered, it is sent towards a server center 30 that will analyze the request and orient it towards another person, who has formulated a similar proposal Different interlocuters can come into contact with each other directly, in such a way, that the caller transmitting a definite proposal, can directly contact a corresponding person, who has himself, put forward a similar proposal earlier.

The server center 30 appropriately diverts the different parameters of the proposal after analyzing them (in our example): choice of film, time, geographical location, transport means, etc. Direct telephone contact basically respects the confidentiality of the parties concerned, because one party can never be in a position to know any information regarding the other, because the contact is established in a completely anonymous fashion. The server center 30 acts as a selective and intelligent call-diverting unit. The first person to call the server center 30 leaves the parameters of a specific proposal, as well as his telephone number. The next caller with a compatible proposal sees his call directly oriented towards the first person having made a similar request. Of course, this message center can have a simplified form, such as consultation of a database: stock exchange, sports results, weather, etc. The message center can be used either by a specific section of the population, having a memory chip card, or an interchangeable chip, dedicated to a specific use after having paid their dues; or, it can address a wider, less specific section of the population, such as subscribers to message centers of the "MINITEL" type.

Figure 2A:
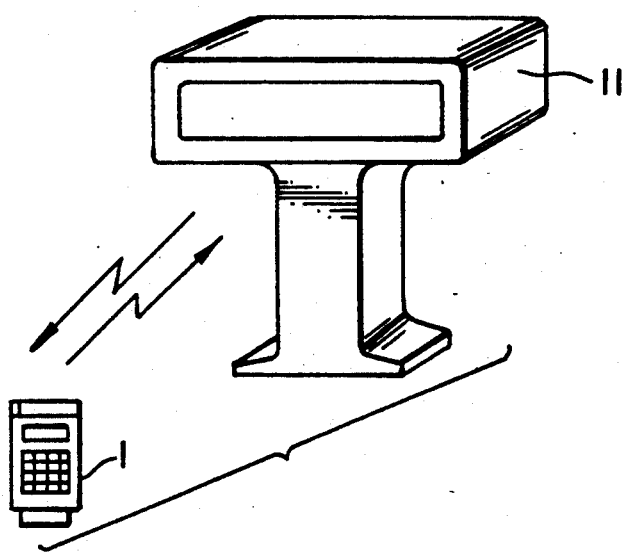
FIGS. 2A and 2B illustrate a portable casing communicating with a specialized terminal and via a telephone receiver, repsectively, in accordance with the present invention.
Figure 2B:
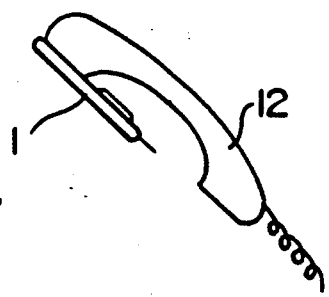

We will now describe, as a non-limiting example, one special embodiment of the invention, with reference to the annexed drawings, wherein;

FIGS. 1A and 1B illustrate a portable casing according to the invention;

FIGS. 2A and 2B illustrate a portable casing of the present invention in transmission mode.

In FIGS. 1A and 1B, we have a casing (1) that has integrated processing means, controlled, for example, by a micro-processor and communication means. A keyboard (4) enables the user to manually enter the data; an infrared transmitter/receiver (6) enables dialogue with a terminal (11); an acoustic transmitter (8) and receiver (9) enables dialogue, via a telephone network, with any other system provided to this effect (server, databank, computer center, etc.).

An optical scanner (7) capable of reading specific codes such as bar codes and others. Any data inputted by the above-mentioned communication means can be displayed on a screen (5).

The portable casing includes a card slot (10) adapted to receive a card (2) comprising of one or several micro-circuits (3) and/or one or several memory supports (3). The most typical configuration being the following:

- a permanent micro-circuit containing elements for the identification of the user;
- an interchangeable micro-circuit containing a memory and enabling a specific use by the user, for example, a micro-circuit integrating plane time tables, the different shows in a city, etc., or, more broadly, a micro-circuit enabling access to a particular server center.

FIG. 2A depicts shows a portable casing (1) communicating with a specialized terminal (11) by virtue of their respective optical interfaces, and FIG. 2B illustrates a portable casing (1) communicating via a telephone receiver (12).

Other variations and modifications can, of course, be brought to this description, but these will neither be outside the scope, nor the spirit of the present invention.

I claim:

1. A system for inputting, processing and transmitting information nd data, said system comprising:
    a plurality of memory cards, each of said memory cards comprising permanent memory means for storing permanent data and information, and removable memory means, detachably attached to said memory card, for storing temporary data and information;
    a plurality of portable casings, each of said casings comprising a card slot for selectively receiving one of said memory boards, communication means for selectively transmitting and receiving data and information optically or acoustically, and a keyboard for manually inputting information; and
    a plurality of specialized terminals capable of optically transmitting and receiving data and information with said communication means for said casings whereby said communication means communicates the data and information stored in said memory cards.

2. The system according to claim 1, said communication means comprising a transmitter and receiver for acoustically transmitting and receiving information and data, an optical scanner for optically reading predetermined codes, and an infrared transmitter and receiver.

3. The system according to claim 2 wherein inputting of information is selectively done manually by said keyboard, optically by said optical scanner, acoustically by said acoustic receiver via a telephone network, or optically by said infrared receiver receiving information from one of said specialized terminals or another one of said casings.

4. The system according to claim 3, wherein transmitting of information is selectively done acoustically by said acoustic transmitter via a telephone network, or optically by said infrared transmitter transmitting information to one of said specialized terminals or another one of said casings.

5. The system according to claim 4, wherein the outputted information comprises permanent information for identifying the user of said portable casing.

6. The system according to claim 4, wherein said portable casings transmit requested information via a telephone network to a central server that processes and reorients the requested information to another portable casing corresponding to the requested information.

7. The system according to claim 2, wherein any two portable casings can communicate with each other by virtue of their respective infeared transmitters and receivers, when said casings are within a predetermined distance with respect to one another, and by virtue of their respective acoustic transmitters and receivers via a telephone network.

8. The system according to claim 2, wherein each of said casings can communicate with a specialized server, via said specialized terminals, by virtue of said infeared transmitter and receiver, and by virtue of said acoustic transmitter and receiver via a telephone network.

9. The system according to claim 2, wherein a bank card or credit card is selectively insertable into said card slot of said portable casing so that payments can be made via a telephone network by virtue of said acoustic transmitter and receiver.

10. The system according to claim 1, wherein each of said portable casings further comprises a screen for displaying information and data.

11. The system according to claim 10, wherein said portable casings, after transmitting and inputting appropriate information, can selectively act as a substitute for a written document, justifying a transaction or authorizing access, by displaying on said screen parameters approving the transaction or justifying the access.

12. The system according to claim 1, wherein said portable casings transmit a set of data to one of said specialized terminals connected to a gate for enabling the unlocking of said gate and authorizing access.

* * * * *